(12) United States Patent
Yuen et al.

(10) Patent No.: US 11,436,572 B2
(45) Date of Patent: Sep. 6, 2022

(54) CONDUCTING TRANSACTIONS BETWEEN LOCAL AND REMOTE COMPUTER SYSTEMS

(71) Applicant: THE CANADIAN DEPOSITORY FOR SECURITIES LIMITED, Toronto (CA)

(72) Inventors: Raymond Yuen, Toronto (CA); George Chung, Toronto (CA); Yin Lai Annie Mah, Toronto (CA)

(73) Assignee: THE CANADIAN DEPOSITORY FOR SECURITIES LIMITED, Toronto (CA)

( * ) Notice: Subject to any disclaimer, the term of this patent is extended or adjusted under 35 U.S.C. 154(b) by 141 days.

(21) Appl. No.: 17/108,440

(22) Filed: Dec. 1, 2020

(65) Prior Publication Data
US 2021/0166200 A1 Jun. 3, 2021

Related U.S. Application Data

(60) Provisional application No. 62/942,991, filed on Dec. 3, 2019.

(51) Int. Cl.
*G06Q 20/02* (2012.01)
*G06Q 40/06* (2012.01)
(Continued)

(52) U.S. Cl.
CPC ......... *G06Q 20/023* (2013.01); *G06Q 20/108* (2013.01); *G06Q 40/04* (2013.01); *G06Q 40/06* (2013.01)

(58) Field of Classification Search
CPC .... G06Q 20/023; G06Q 20/108; G06Q 40/04; G06Q 40/06; G06Q 20/12; G06Q 20/405
See application file for complete search history.

(56) References Cited

U.S. PATENT DOCUMENTS 8,244,831 B1 * 8/2012 McLennan .......... H04L 67/1095
709/200
10,091,215 B1 * 10/2018 Word .................. H04L 63/1408

FOREIGN PATENT DOCUMENTS

WO WO-2015200830 A1 * 12/2015 ............. G06F 9/546

OTHER PUBLICATIONS

Hollan, Jeff: Ordered queue processing in Azure Functions with Sessions, May 30, 2019, pp. 1-17 (Year: 2019).*

(Continued)

*Primary Examiner* — Bijendra K Shrestha
(74) *Attorney, Agent, or Firm* — Perry + Currier Inc.

(57) ABSTRACT

A local computer system connects to a remote computer system of a remote component of FMI. The local computer system stores an account identifier of a single account at the remote component of financial market infrastructure (FMI). The local computer system communicates with the remote computer system using the account identifier to clear and settle trades with the remote component of FMI. The local computer system stores local node identifiers for local nodes. The local computer system communicates with each local node using a local node identifier. The local computer system communicates local transaction data with local nodes with reference to the local node identifiers. The local computer system communicates remote transaction data with the remote computer system with reference to local node identifiers and the account identifier of the single account. The local computer system synchronizes the local transaction data with the remote transaction data.

16 Claims, 6 Drawing Sheets

(51) Int. Cl.
*G06Q 40/04* (2012.01)
*G06Q 20/10* (2012.01)

(56) References Cited

OTHER PUBLICATIONS

Sun Microsystem: Chapter 2 The Message Queue Messaging System, 2003, pp. 1-41 (Year: 2003).*
DeCarvalho, Cynthia H.: Cross-Border Securities Clearing and Settlement Infrastructure in the European Union as a Prerequisiteto Financial Market Integration: Challenges and Perspectives, 2004, HWWA, Hamburg, pp. 1-58 (Year: 2004).*

* cited by examiner

CONDUCTING TRANSACTIONS BETWEEN LOCAL AND REMOTE COMPUTER SYSTEMS

FIELD

The present disclosure relates to computer systems, networked communications, and data processing.

BACKGROUND

Computer systems may be located in different geographical regions. Synchronizing communications among disparate and distant computer systems can be challenging, particularly when such systems are operated according to different systemic, structural, or regulatory requirements specific to a country or region.

SUMMARY

According to one aspect of the present disclosure, a system includes a local computer system employed to connect, via a computer network, to a remote computer system of a remote component of financial market infrastructure (FMI), such as a remote securities clearinghouse or remote securities depository. The local computer system stores an account identifier of a single account at the remote component of FMI. The local computer system is to communicate with the remote computer system on the basis of the account identifier to clear and settle trades with the remote component of FMI. The local computer system stores a local node identifier for each local node of a plurality of local nodes. The local computer system is to communicate with each local node on the basis of the local node identifier. The local computer system is to communicate local transaction data with the plurality of local nodes with reference to the local node identifiers. The local computer system is to communicate remote transaction data with the remote computer system with reference to local node identifiers and the account identifier of the single account. The local computer system is to synchronize the local transaction data with the remote transaction data.

According to another aspect of the present disclosure, a process includes storing an account identifier of a single account with a remote component of FMI. A local computer system is to communicate with the remote component of FMI on the basis of the account identifier to clear and settle trades. The process further includes storing a local node identifier for each local node of a plurality of local nodes. The local computer system is to communicate with each local node on the basis of the local node identifier. The process further includes communicating local transaction data with the plurality of local nodes with reference to the local node identifiers, communicating remote transaction data with the remote component of FMI with reference to local node identifiers and the account identifier of the single account, and synchronizing the local transaction data with the remote transaction data.

DETAILED DESCRIPTION

Figure 1:
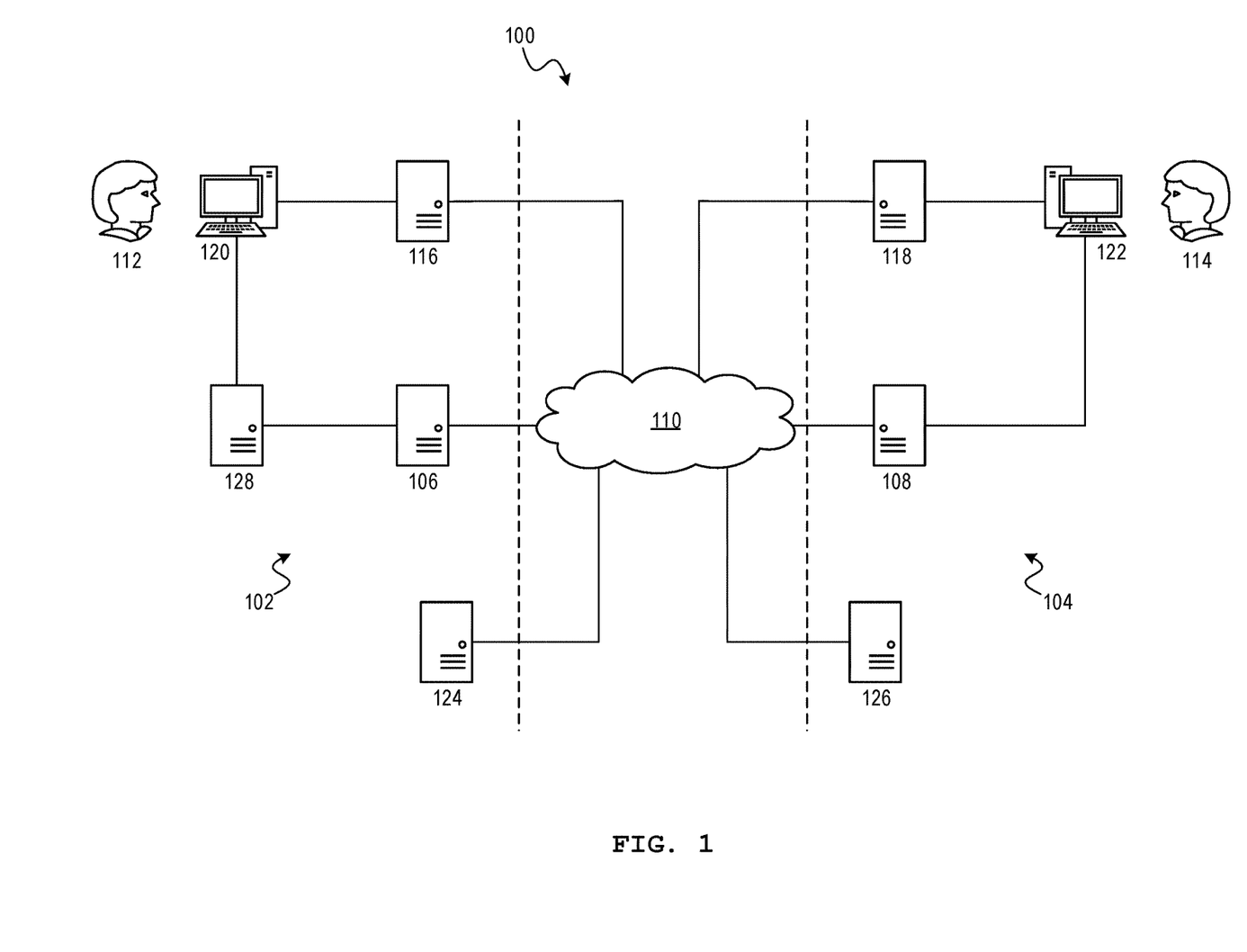
FIG. 1 is a block diagram of a system to facilitate communications between disparate computer systems.

FIG. 1 shows an example computer system 100 according to the present disclosure. The system 100 may span several time-separated domains 102, 104, such as different countries or authorities. A local computer system 106 may be provided in one domain, such as Canada or the United States. A remote computer system 108 may be provided in another domain, such as China or India.

The domains 102, 104 may have different requirements for data communications and may operate in different time zones. The present disclosure concerns synchronizing data communications to provide interoperability between different data requirements and different time zones. Examples of data requirements include identity information to clear and settle a securities trade. For example, Chinese or Indian regulations may require that the identity of the end beneficiary of a trade be known and recorded. Regulations in Canada or the United States may differ and may not require the same degree of identity information. For example, in cross-border trade scenario, trade information originating from Canada or the United States may lack critical identity information and thereby fail to meet Chinese market standards.

The local computer system 106 is connected, via a computer network 110, to the remote computer system 108. The local computer system 106 may be operated by a local clearinghouse or securities depository, an entity that combines dealer/broker and clearing services, or a similar local component of FMI.

The component of remote FMI operated by the remote computer system 108 has a single-tier account hierarchy that requires identity information of end investors. The remote computer system 108 may be operated by a remote securities clearinghouse, such as the Shanghai Clearing House, China Securities Depository and Clearing Corporation Limited (CSDC) National Securities Depository Limited (NSDL), Central Depository Services (India) Ltd (CDSL), or similar component of remote FMI.

Examples of a computer network 110 include a local-area network (LAN), a wide-area network (WAN), a virtual private network (VPN), an intranet, and the internet. The computer network no may include any number and arrangement of such networks. For example, the local computer system 106 may operate in a private network domain (e.g., a LAN or intranet) that is connected to the internet via a firewall. The remote computer system 108 may have an analogous architecture and communications between the systems 106, 108 may be facilitated by a private or public network, such as the internet or a secure channel through the internet. Encryption may be used to secure communications between the systems 106, 108.

The local and remote computer systems 106, 108 may exchange data relevant to the clearing and settlement of securities trades, such as bond trades, between local and remote nodes 112, 114, which may be end investors such as financial institutions. The component of remote FMI operated by the remote computer system 108 requires identity information for each end investor represented by a node 112, 114, whereas the local computer system 108 does not require end investor information and instead has the flexibility to operate with intermediaries who represent end investors. This will be discussed in detail below.

The local and remote nodes 112, 114 may also communicate through the computer network 110, directly or indirectly, via two other channels.

First, the local and remote nodes 112, 114 may communicate through respective trading platforms 116, 118. A trading platform 116, 118 may include computer hardware and software configured to allow parties to directly interact and agree on the particulars of a securities trade. The local and remote nodes 112, 114 may operate their respective trading platforms 116, 118 through respective local and remote terminals 120, 122.

Second, the local and remote nodes 112, 114 may communicate through a payment channel controlled by respective local and remote payment correspondents and their systems 124, 126. This is relatively indirect communication, as payment may be effected by various representatives, financial institutions, or the like. The local and remote systems 124, 126 may be members of a payment system, such as Cross-Border Interbank Payment System (CIPS), China National Advanced Payments System (CNAPS), or other payment system or PS as may be defined by the Committee on Payment and Settlement Systems of the International Organization of Securities Commissions (CPSS-IOSCO). Payment systems 124, 126 may employ Society for Worldwide Interbank Financial Telecommunication (SWIFT) or a similar payment network.

Communications between the remote terminal 122 and the remote computer system 108 and remote trading platform 118 may be via the computer network 110 or a portion thereof.

Communications between the local terminal 120 and the local computer system 106 and local trading platform 116 may be via the computer network 110 or a portion thereof. Further, in examples where the local computer system 106 is operated by a securities clearinghouse, the system 100 may further include an intermediary computer system 128, i.e., a parent node, that may be operated by a securities dealer/broker that represents end investors, who may be considered child nodes 112, before the securities clearinghouse operating the local computer system 106. A hierarchy of parent nodes and child nodes may exist in which child nodes represent end investors who communicate with the local computer system 106 through representative parent nodes (e.g., dealers or other market participants) that are registered with the local computer system 106. A parent node may also act as an end investor on its own behalf. In other examples, the function of the intermediary computer system 128 is integral to the local computer system 106 and the local computer system 106 communicates directly with local nodes 112.

The system 100 may be scaled to serve any practical number of local and remote nodes 112, 114 to enable such participates to perform data communications required to enter, clear, and settle securities trades, such as bond trades. Further, as will be discussed below, the local computer system 106 is specifically configured to synchronize quickly the relevant data with the remote domain 104. As such, the effectiveness and speed of communications between local and remote nodes 112, 114 may be increased, despite the local and remote nodes 112, 114 being geographically distant. Further, data integrity between the local and remote domains 102, 104 may be maintained, so that the relevant computer systems in each domain 102, 104 have consistent copies of the communicated data.

Figure 2A:
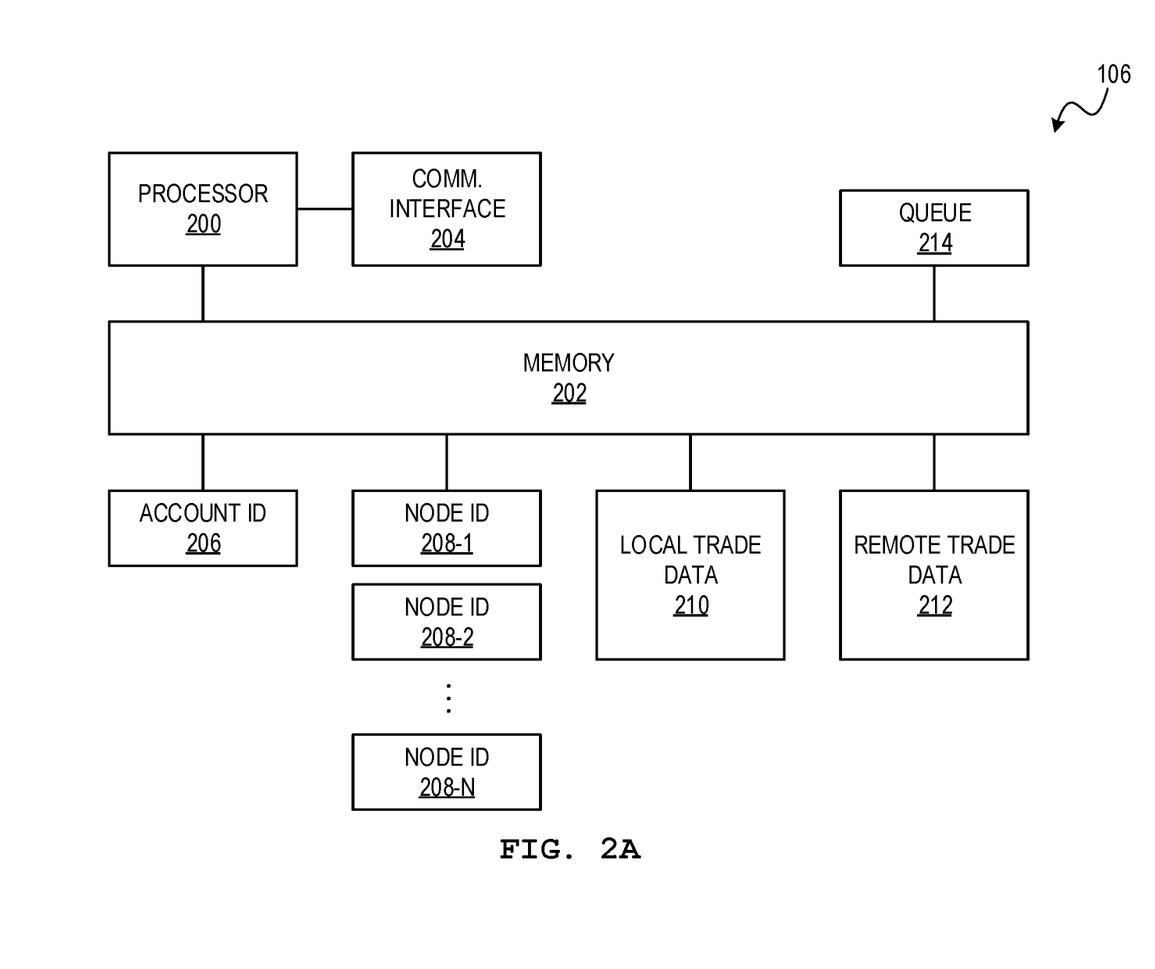
FIG. 2A is a block diagram of a local computer system.

With reference to FIG. 2A, the local computer system 106 includes a processor 200, memory 202, and communications interface 204 to connect to the computer network 110.

The processor 200 is connected to the communications interface 204 and the memory 202. The processor 200 may execute instructions, which may be stored in the memory 202, to implement the functionality described herein.

The processor 200 may include a central processing unit (CPU), a microcontroller, a microprocessor, a processing core, a field-programmable gate array (FPGA), and/or similar device capable of executing instructions. The processor 200 may cooperate with the memory 202, which may include a non-transitory machine-readable medium that may be an electronic, magnetic, optical, and/or other physical storage device that encodes executable instructions. The machine-readable medium may include, for example, random access memory (RAM), read-only memory (ROM), electrically-erasable programmable read-only memory (EEPROM), flash memory, a storage drive, an optical disc, and/or similar.

The local computer system 106 includes an account identifier 206 of a single account established at the remote computer system 108. The account identifier 206 forms the basis of data communications from the local computer system 106 to the remote computer system 108. That is, the account identifier may indicate which data at the remote computer system 108 may be modified by messages received from the local computer system 106. Examples of such messages include messages to clear and settle trades with a remote securities clearinghouse operating the remote computer system 108. Such messages may use the account identifier 206 as a key to uniquely distinguish the local computer system 106 from other entities that may communicate with the remote computer system 108. The account identifier 206 may identify an omnibus account of a local clearinghouse or securities depository, which operates the local computer system 106. In other examples, the local computer system 106 includes account identifiers 206 for multiple different independent accounts that are operated as single accounts, as above.

The local computer system 106 further includes a local node identifier 208-1 to 208-N (or generally "208") of each of a plurality of local nodes 112. Any number, N, of unique local market identifiers may be provided for the same number, N, of local nodes 112. A local node identifier may be assigned by a remote market authority, such as the People's Bank of China (PBOC), and may be numeric or alphanumeric. For example, a local market identifier may be a PBOC Foreign Institutional Investor (FII) identification code. Further, in examples where an intermediary computer system 128 is used, a local node identifier 208 may further include an identifier specific to the intermediary, as various different intermediaries may represent various different or same local nodes 112. Intermediary-to-participant relationships may be one-to-one, one-to-many, and many-to-one. That is, a local node 112 may be represented by one or more different intermediaries, which operate different intermediary computer systems 128. An intermediary identifier may be numeric or alphanumeric.

Table 1 shows examples of local node identifiers 208 expressed as a combination of end beneficiary identifiers (e.g., PBOC FII) and intermediary identifiers (e.g., broker ID).

TABLE 1

| intermediary id | beneficiary id |
|---|---|
| 1000 | 5000 |
| 1000 | 5001 |
| 1000 | 5002 |
| 1001 | 5000 |
| 1002 | 5003 |

The local node identifiers 208 are unique to local nodes 112, and when an intermediary is used, the combination of end beneficiary identifier and intermediary identifier is unique.

The identifiers 206, 208 may be stored in the memory 202.

The local computer system 106 is configured to communicate with each local node 112 on the basis of the respective unique local node identifier 208. That is, messages are formed and sent from the local computer system 106 to a local terminal 120 or an intermediary computer system 128 with the local node identifier 208 used as a key to uniquely identify the target local node 112.

The local computer system 106 is configured to communicate local transaction data 210 with local nodes 112, via the communication interface 204, with reference to the local node identifiers. The local transaction data 210 may include confirmation messages received from local nodes 112, where such confirmation messages correspond to unconfirmed trade messages received from the remote computer system 108. That is, the local computer system 106 may request a confirmation of remotely initiated trade from the identified local node 112. The local transaction data 210 may also include messages indicative of asserted trades received from local nodes 112, where such assertions are awaiting confirmation by the remote computer system 108.

In response to receiving a confirmation message for an asserted trade, whether the assertion comes from the local node 112 and the confirmation message comes from the remote computer system 106 or vice versa, the local computer system 106 is configured to proceed with clearing and settlement.

The local computer system 106 is configured to communicate remote transaction data 212 with the remote computer system 108 with reference to local node identifiers 208 and the account identifier 206 of the single account. Remote transaction data may include settlement confirmation messages received from the remote computer system 108, where such messages correspond to asserted trade messages of trades made by local nodes 112. Remote transaction data 212 may further include messages indicative of asserted trades received from the remote computer system 108, where such assertions are awaiting confirmation by local nodes 112.

In other words, local transaction data 210 includes information received from and sent to (or queued to be sent to) local nodes 112, and this information may be organized around the unique local node identifiers 208. Remote transaction data 212 includes information received from and sent to (or queued to be sent to) the remote computer system 108, and this information may be organized around unique local node identifiers 208 and account identifier 206.

Local and remote transaction data 210, 212 may be stored in the memory 202.

The local computer system 106 is configured to synchronize the local transaction data 210 with the remote transaction data 212. That is, asserted trades, whether received from a local node 112 or the remote computer system 106 are matched to received confirmation messages, whether received from the remote computer system 106 or the local node 112. Local transaction data 210 may represent state known to the local domain 102 and remote transaction data may represent state known to the remote domain 104. The local computer system 106 may transmit messages and map received messages to stored information to synchronize local and remote state.

The local computer system 106 may further include a queue 214 to queue local transaction data 210 received from a local node 112 for a duration before a predetermined time window of operation of a remote component of FMI implemented by the remote computer system 108. For example, the remote computer system 108 may be in a different time zone from the local computer system 106. The local computer system 106 may thus compute the delay duration based on the predetermined time window of operation translated into a local time. For example, communication outgoing from the local computer system 106 may be held in queue at the local computer system 106 until a predetermined time at the geographic location of the remote computer system 108 (e.g., 9:00 AM at the remote domain 104). On or after the start of the predetermined time window of operation (e.g., at or after 9:00 AM at the remote domain 104), the local computer system 106 communicates the queued local transaction data to the remote computer system 108. Such communicated data may also be considered remote transaction data 212. The reduces or eliminates the need for queuing of an unpredictable quantity of incoming messages at the remote computer system 108. Further, the predetermined time window of operation at the remote location may correspond to a trading day at the remote location.

The local computer system 106 is further to receive, via the communications interface 204, settlement confirmation messages from the local payment system 124 of the interbank payment system. The local computer system may communicate such settlement confirmation messages to the relevant local node 112.

Figure 2B:
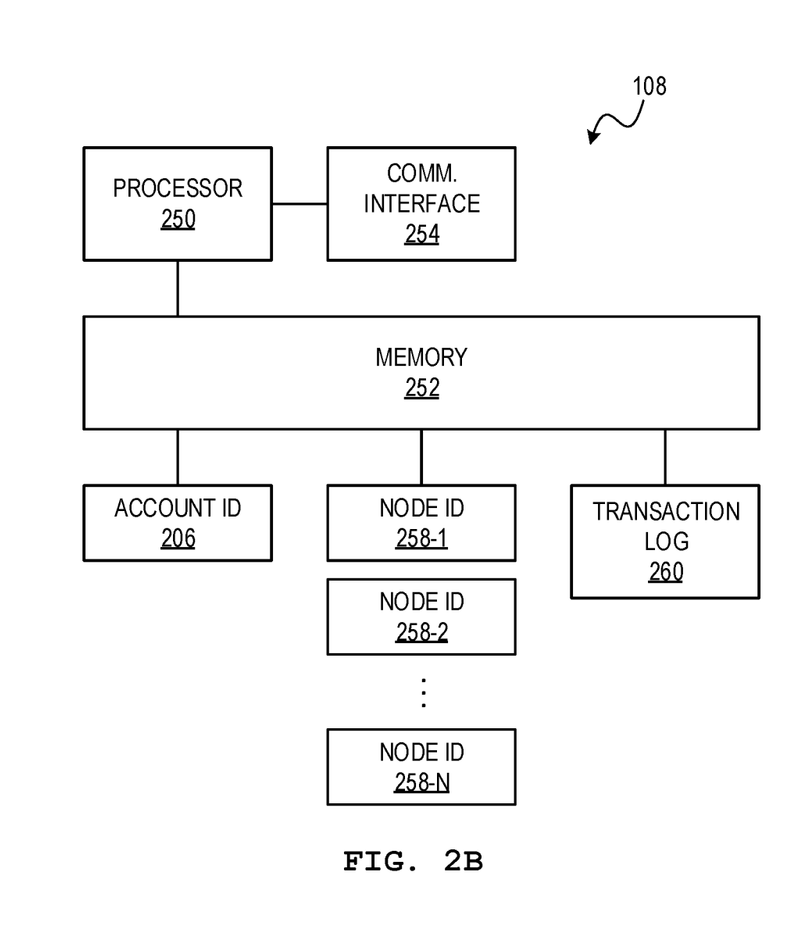
FIG. 2B is a block diagram of a remote computer system

With reference to FIG. 2B, the remote computer system 108 includes a processor 250, memory 252, and communications interface 254 to connect to the computer network 110.

The processor 250 is connected to the communications interface 254 and the memory 252. The processor 250 may execute instructions, which may be stored in the memory 252, to implement the functionality described herein.

The remote computer system 108 may include the account identifier 206 of the single account allocated to the local computer system 106. The remote computer system 108 may further include remote node identifiers 258-1 to 258-M (generally "258") of a number of remote nodes 114, so that transactions between the remote computer system 108 and remote nodes 114 may be conducted. A remote node identifier 258 may be a PBOC identifier.

The remote computer system 108 may further include a transaction log 260 to store a history of transactions between remote and local nodes 114, 112. The transaction log 260 may record the respective node unique identifiers 258, 208. Although the local-side of a transaction is executed through the single account allocated to the local computer system 106, the transaction log 260 may still record the local node identifier 208 for reporting/audit purposes.

Figure 3:
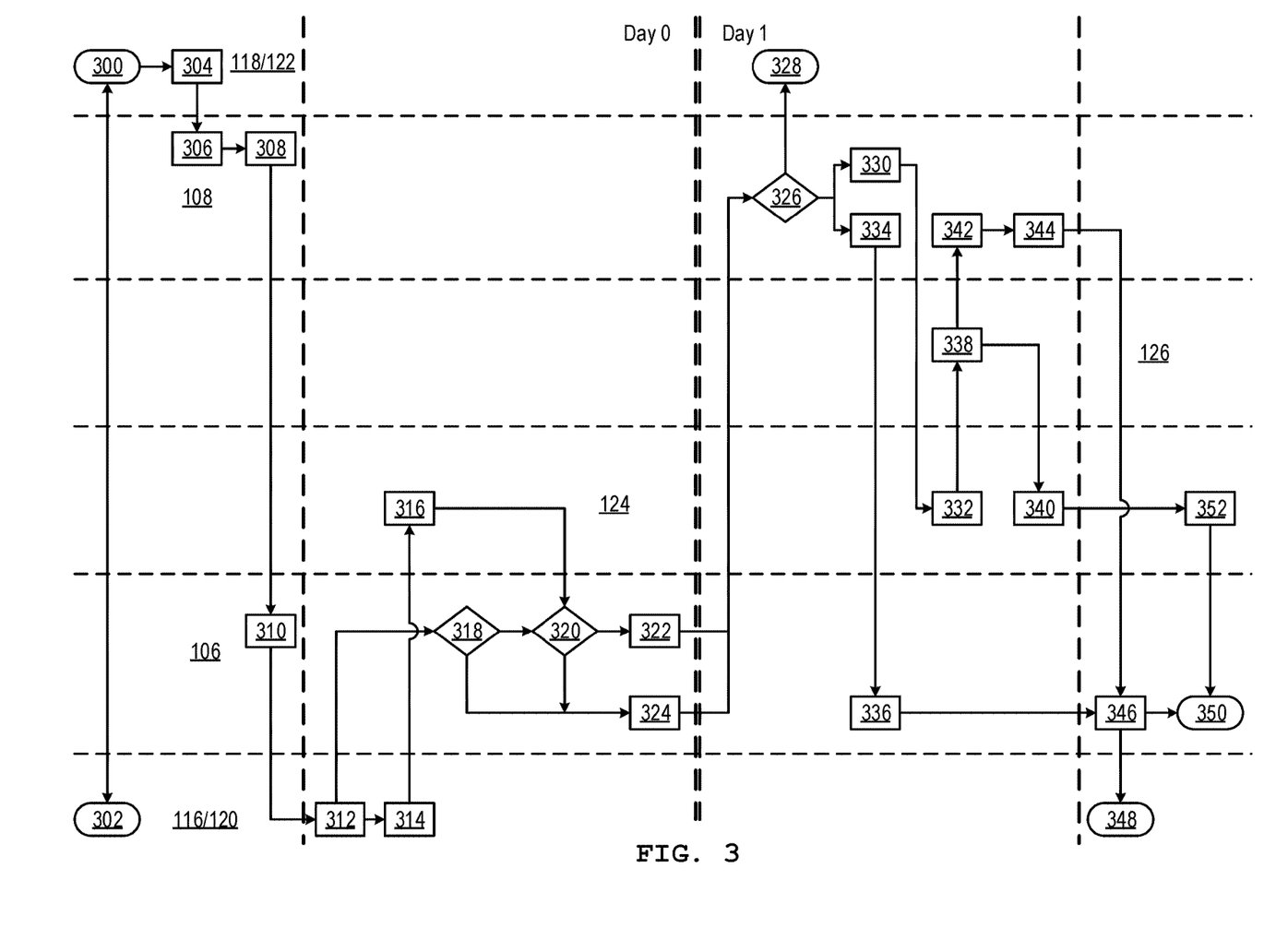
FIG. 3 is a flowchart of a process to clear a transaction between disparate computer systems, in which a local computer system handles a buy-side of a transaction.

With reference to FIG. 3, a process for clearing a transaction is shown in the case where a local computer system processes a purchase of a financial security, such as a bond.

At blocks 300, 302, a seller and buyer agree to a transaction using respective trading platforms 118, 116. At block 300, the selling remote node 114 interacts with their trading platform 118 and, at block 302, the buying local node 112 interacts with their trading platform 116.

At block 304, the seller provides a transaction instruction that includes identifying information, such as their identity at the remote computer system 108 (e.g., their unique node ID 258), the local node identifier 208 (e.g., a PBOC FII with or without an intermediary ID) of the buyer, and a security identifier that uniquely identifies the bond or other security being traded. The seller may provide this information to the remote computer system 108 through their remote terminal 122.

At block 306, the remote computer system 108 validates the received transaction instruction. Validation may include confirming that the position instructed by the seller is available. Further, the identifying information provided may be validated against known identifiers. Then, the remote computer system 108 transmits an unconfirmed trade message to the local computer system 106, at block 308.

Then, at block 310, the local computer system 106 receives the unconfirmed trade message, converts it to a local format, and stores it.

Blocks 300-310 may be performed during the trading day ("day 0") at the location of the remote computer system 108, so as to be performed in real time or near real time with respect to the remote computer system 108. The local computer system 106 can be configured to operate during the trading day of the remote location, so that the remote computer system 108 need only operate during its normal business day.

Then, at block 312, the local computer system 106 communicates a message indicative of the received unconfirmed trade to the terminal 120 of the local node 112 buying the security. If the trade is confirmed by the local node 112, then the local node 112 responds with a confirmation message to local computer system 106 and transfers funds to the local payment system 124, at block 314. Payment is received by the local payment system 124, at block 316.

When both the confirmation of the transaction is received by the local computer system 106, at block 318, and confirmation of receipt of funds is received by the local computer system 106 from the local payment system 124, at block 320, then the local computer system 106 constructs a confirmation message, at block 322, and sends such message to the remote computer system 108.

If one or both of the confirmations of the transaction and payment are negative or not received by the local computer system 106, then the local computer system 106 constructs and sends a trade rejection message to the remote computer system, at block 324.

Blocks 312-324 may be performed during the business day at the location of the local computer system 106. Messages resulting from blocks 322, 324 may be queued at the local computer system 106 and transmitted to the remote computer system 108 at the start of the business day at the location of the remote computer system 108, so that the remote computer system 108 need not operate during non-business hours.

The remote computer system 108 receives the confirmation/rejection message, at block 326. Trade rejection is reported to the remote node, at block 328. Trade rejection, via this pathway, is indicative of a miscommunication, data entry error, or data communication error, as the trade was agreed in principle at blocks 300, 302.

Trade confirmation, at block 326, triggers the remote computer system 108 to freeze the seller's position, with respect to the security being sold, at block 330. This is communicated to the local payment system 124, at block 332. In effect, the security being sold is frozen by the remote computer system 108, which then generates a corresponding funds transaction instruction that is sent to the local payment system 124.

At about the same time, the remote computer system 108 transmits a trade confirmation message to the local computer system 106, at block 334. The trade confirmation message may include a settlement instruction reference number or ID. Further, the trade confirmation message may include a trade reference number originally provided by the local computer system 106, so that the local computer system 106 can correlate outgoing and incoming messages.

At block 336, the local computer system 106 matches the received settlement instruction with information shared with the local payment system 124, so that the relevant payment may be allocated to the trade.

At block 332, the local payment system 124 transfers funds to the remote payment system 126, which receives the funds, at block 338, and confirms same to the local payment system 124, at block 340. The remote payment system 126 also communicates a message indicative of receipt of funds to the remote computer system 108, at block 342.

In response to receiving confirmation of payment, at block 342, the remote computer system 108 adjusts the holdings of the security at the account of the remote seller node 114 and the account of the local computer system 106, at block 344. That is, the security sold is debited from the account of the remote seller node 114 and credited to the single account of the local computer system 106. As such, the remote computer system 108 stores the record of the transaction as having occurred between the remote seller node 114 and the omnibus account of the local computer system 106.

The remote computer system 108 then communicates a message indicating that the transfer has occurred to the local computer system 106, at block 346, which records the transaction in terms of the identity of the buyer node 112.

Blocks 326-344 may be performed during the day after ("day 1") the trading day at the location of the remote computer system 108, so as to be performed in real time or near real time with respect to the remote computer system 108.

Finally, at block 348, the local computer system 106 may communicate a settlement message to the local node 112. The local computer system 106 may also reconcile transaction settlements, at block 350, using end-of-day transaction reports generated by the local payment system 124, at block 352.

Figure 4:
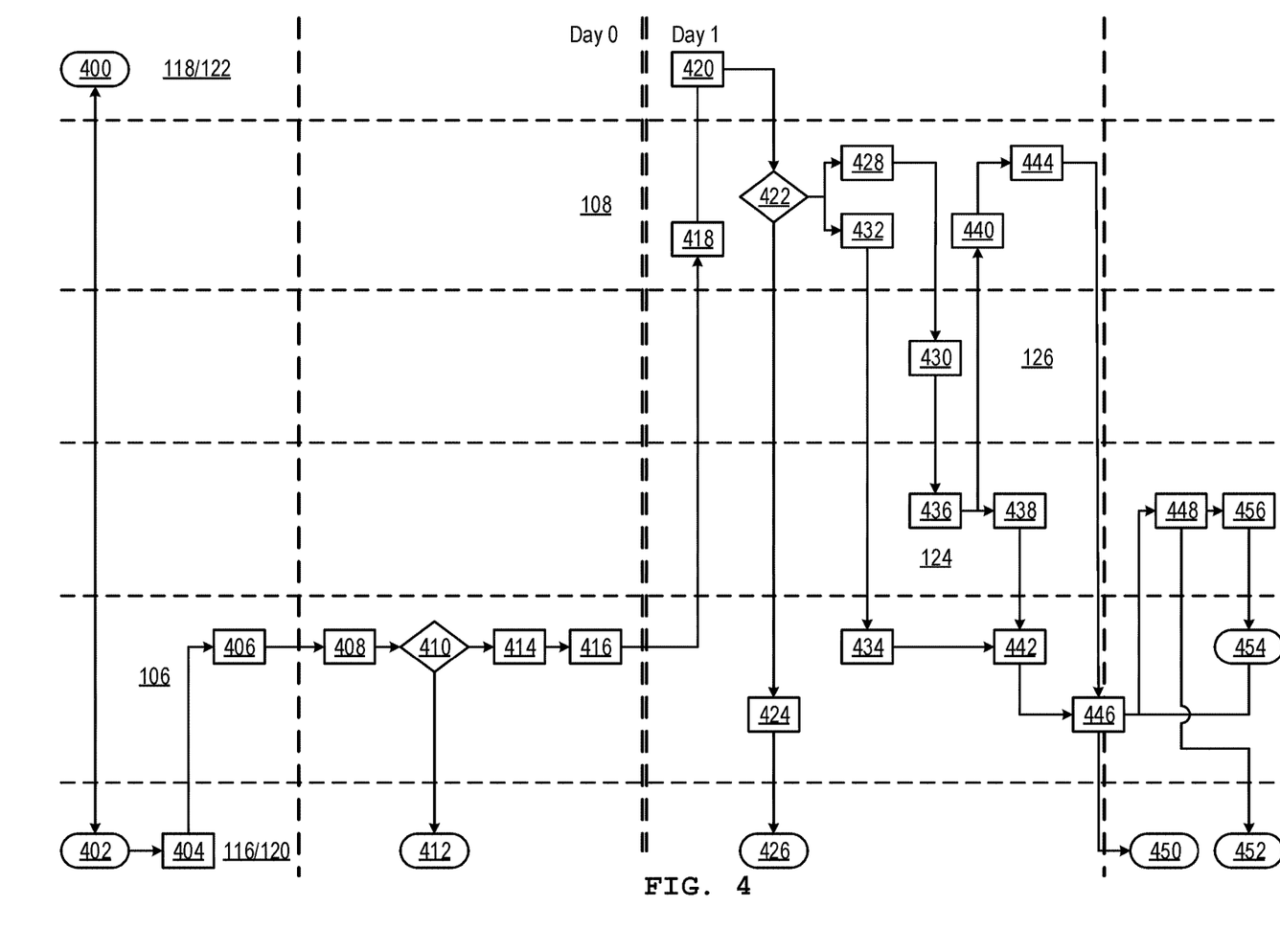
FIG. 4 is a flowchart of a process to clear a transaction between disparate computer systems, in which a local computer system handles a sell-side of a transaction.

With reference to FIG. 4, a process for clearing a transaction is shown in the case where a local computer system processes a sale of a financial security, such as a bond.

With reference to FIG. 4, a process for clearing a transaction is shown in the case where a local computer system processes a sale of a financial security, such as a bond.

At blocks 400, 402, a buyer and seller agree to a transaction using respective trading platforms 118, 116. At block 400, the buying remote node 114 interacts with their trading platform 118 and, at block 402, the selling local node 112 interacts with their trading platform 116.

At block 404, the seller local node 112 provides a transaction instruction that includes identifying information and a security identifier that uniquely identifies the bond or other security being traded. The seller may provide this information to the local computer system 106 through their local terminal 120. The intermediary computer system 128 may facilitate communications between the local node 112 and the local computer system 106. The seller local node 112 or the intermediary computer system 128 identifies the seller local node 112 to the local computer system 106 using the respective local node identifier 208 (e.g., a PBOC FII with or without an intermediary ID). Further, the instruction also identifies the buyer node 114 by way of a similar identifier 258 that is known to the remote computer system 108 and shared by the buyer with the seller.

At block 406, the local computer system 106 receives the unconfirmed trade message, converts it to its local format, and stores it.

Blocks 400-406 may be performed during the trading day ("day 0") at the location of the remote computer system 108, so as to be performed in real time or near real time with respect to the remote computer system 108. The local computer system 106 can be configured to operate during the trading day of the remote location, so that the remote computer system 108 need only operate during its normal business day.

Subsequently, at block 408, the local computer system 106 validates the received transaction instruction. This validation may include confirming that the securities position instructed by the seller is available. Further, the identifying information provided may be validated against known identifiers.

If the securities position is not available, or there is an error in the identifying information, as determined at block 410, the local computer system 106 rejects the trade and alerts the seller of same, at block 412.

If the validation is successful, then at block 414, the local computer system 106 allocates the security to the trade.

The local computer system 106 then forms and queues an unconfirmed trade message, at block 416, to be sent to the remote computer system 108.

Blocks 408-416 may be performed during the business day at the location of the local computer system 106. Unconfirmed trade messages are queued at the local computer system 106, at block 416, and transmitted to the remote computer system 108 at the start of the business day at the location of the remote computer system 108, so that the remote computer system 108 need not operate during its non-business hours.

Once the queue duration has elapsed, the local computer system 106 transmits the unconfirmed trade message to the remote computer system 108, which receives it at block 418. The unconfirmed trade message identifies the single account 206 of the local computer system 106 to the remote computer system 108 and further provides the identifying information of the seller and buyer, such as their respective unique node identifiers 208, 258.

The remote computer system 108 then confirms the trade with the buying remote node 114, at blocks 420, 422. If the transaction cannot be confirmed or is rejected by the buyer, then remote computer system 108 transmits a trade rejection message to the local computer system 106, at block 424, which informs the selling local node 112 of same, at block 426. Trade rejection, via this pathway, is indicative of a miscommunication, data entry error, or data communication error, as the trade was agreed in principle at blocks 400, 402.

Trade confirmation, at block 422, triggers the remote computer system 108 to freeze the seller's position, with respect to the security being sold, at block 428. This is communicated to the remote payment system 126, at block 430. In effect, the security being sold is frozen by the remote computer system 108, which then generates a corresponding funds transaction instruction that is sent to the remote payment system 126.

At about the same time, the remote computer system 108 transmits a trade confirmation message reference number or ID to the local computer system 106, at block 432. The trade confirmation message may include a settlement instruction. Further, the trade confirmation message may include a trade reference number originally provided by the local computer system 106, so that the local computer system 106 can correlate outgoing and incoming messages.

At block 430, remote payment system 126 transfers funds for the transaction received by the local payment system 124 at block 436. The local payment system 124 then communicates a settlement confirmation message, at block 440, to the remote computer system 108 and, at block 438, to the local computer system 106.

At block 442, the local computer system 106 matches the received settlement confirmation with outgoing messages, which may reference a transaction identifier, to verify that payment was made for the trade.

At the remote computer system, at block 444, the change in position is recorded. That is, the single omnibus account assigned to the local computer system 106 is debited the security transacted, and the buyer's account with the remote computer system 108 is correspondingly credited.

Blocks 418-444 may be performed during the day after ("day 1") the trading day at the location of the remote computer system 108, so as to be performed in real time or near real time with respect to the remote computer system 108.

Then, at block 446, the local computer system 106 closes out the transaction by instructing the local payment system 124 to transfer funds held by the local clearinghouse to an account of the selling local node 112, at block 448. Further, the local computer system 106 sends a message to the selling local node 112 informing them that the trade has been settled, at block 450. The selling local node 112 may then access the funds via the local payment system 124, at block 452.

The local computer system 106 may also reconcile transaction settlements, at block 454, using end-of-day transaction reports generated by the local payment system 124, at block 456.

With respect to the processes shown in FIGS. 3 and 4, the participant initiating a transaction provides information sufficient to identify the buyer and seller. This information includes respective local and remote unique identifiers 208, 258, which act as keys during the transaction. The information provided may also identify an intermediary system 128 that assists the local node 112 with the transaction. The intermediary identifier may be used by the local computer system 106 to accurately clear and settle a transaction, as intermediaries often hold general accounts through which transactions on behalf of multiple local nodes are conducted. Messages communicated between the local computer system 106 and the remote computer system 108 may include all available identifiers, so that an appropriate identifier can be selected for a specific purpose.

Figure 5:
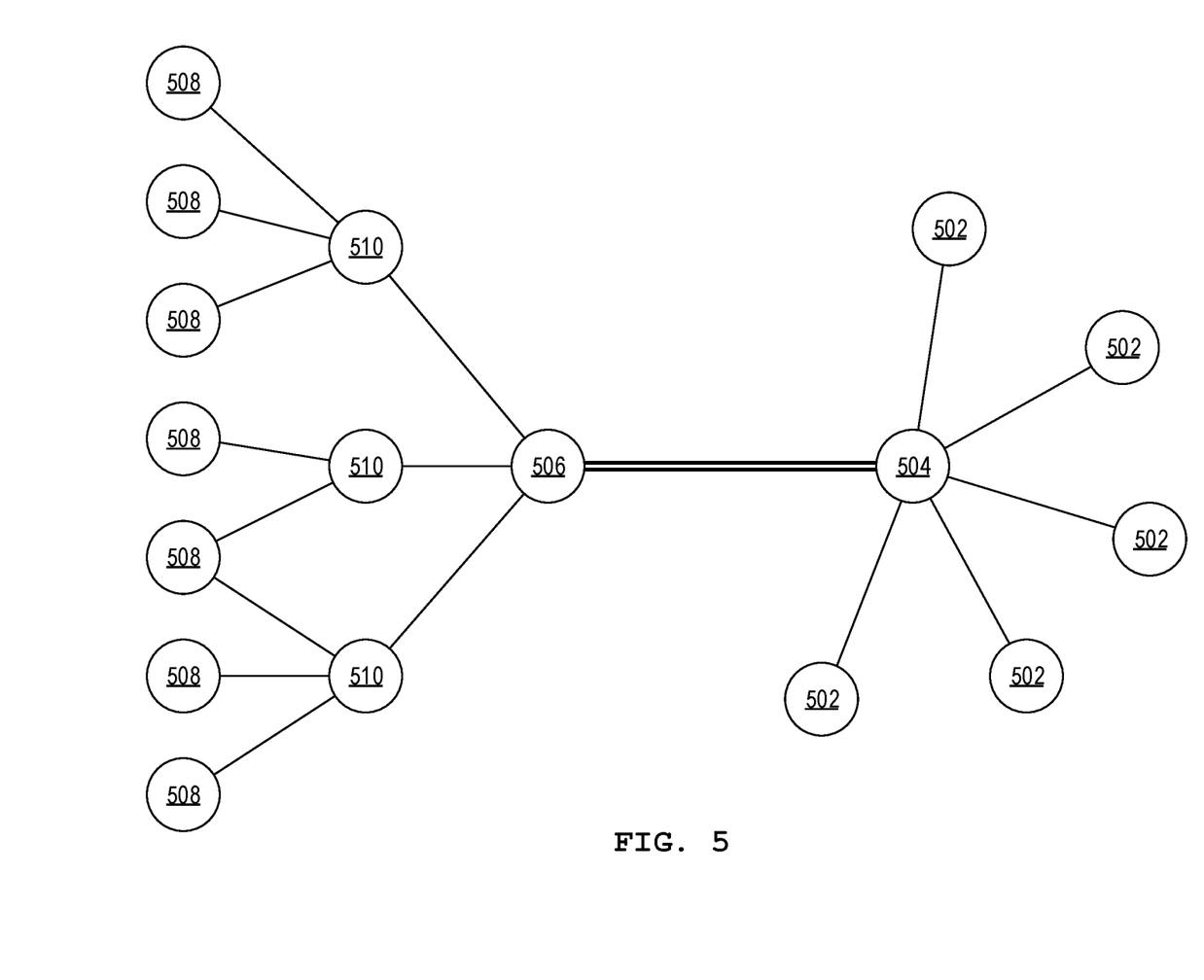
FIG. 5 is a schematic diagram of a local computer system bridging single-tier and hierarchal trading domains.

FIG. 5 shows a schematic of remote nodes 502 representative of remote end investors and their direct, single-tier relationship to a remote computer system 504. A local computer system 506 uses a single account to interact with the remote computer system 504 and further provides identity information to the remote computer system 504 for local end investors at local nodes 508. Local nodes 508 may be child nodes that communicate with the local computer system 506 via intermediary parent nodes 510 operated by dealers or other market participants. The local computer system 506 bridges the different models and may provide effective transaction data communications between the local multi-tier system of nodes 508, 510 and the remote single-tier system.

In view of the above, it can be seen that disparate and distant computer systems can be operated in a synchronized and consistent manner, so as to facilitate a transaction, such as a bond trade. The requirements of the country or authority by which a given system is governed may be met even when security ownership registration models are not harmonized between countries and authorities. Further, operational and staffing cost efficiencies may be improved by coordinating the processing segments of a transaction based on local business hours at the locations of the transacting parties.

The invention claimed is:

1. A system comprising:
a local computer system configured to connect via a computer network to a remote computer system of a remote component of financial market infrastructure (FMI), each of the local computer system and the remote computer system including a processor, memory, and communications interface, wherein the local computer system and the remote computer system are in different time zones;
the local computer system storing an account identifier of a single account at the remote component of FMI, the local computer system configured to communicate with the remote computer system on the basis of the account identifier to clear and settle trades with the remote component of FMI;
the local computer system storing a local node identifier for each local node of a plurality of local nodes, the local computer system configured to communicate with each local node on the basis of the local node identifier;
the local computer system configured to communicate local transaction data with the plurality of local nodes with reference to the local node identifiers;
the local computer system configured to queue local transaction data received from a local node for a duration before a predetermined time window of operation of the remote component of FMI, wherein the local computer system is configured to compute the duration based on the predetermined time window of operation translated into a local time:
the local computer system configured to communicate remote transaction data that corresponds to the queued local transaction data with the remote computer system with reference to local node identifiers and the account identifier of the single account on or after the start of the predetermined time window of operation; and
the local computer system configured to synchronize the local transaction data with the remote transaction data.

2. The system of claim 1, wherein:
the remote transaction data includes unconfirmed trade messages received from the remote computer system; and
the local transaction data includes confirmation messages received from the plurality of local nodes, the confirmation messages corresponding to the unconfirmed trade messages.

3. The system of claim 1, wherein:
the local transaction data received from the plurality of local nodes includes asserted trade messages of trades made by the plurality of local nodes; and
the remote transaction data includes settlement confirmation messages received from the remote computer system.

4. The system of claim 1, wherein the local computer system is further configured to receive settlement confirmation messages from an interbank payment system that is in communication with the remote component of FMI.

5. The system of claim 4, wherein the local computer system is further configured to communicate the settlement confirmation messages to the plurality of local nodes.

6. The system of claim 1, wherein the remote component of FMI is a remote securities clearinghouse or securities depository.

7. The system of claim 1, wherein the local computer system is configured as a local securities clearinghouse or securities depository.

8. The system of claim 7, wherein the local computer system is configured to communicate with each local node through an intermediary computer system that is configured to communicate with local node computer systems on the basis of the local node identifier.

9. A process comprising:
storing an account identifier of a single account with a remote component of financial market infrastructure (FMI), wherein a local computer system is configured to communicate with the remote component of FMI via a remote computer system on the basis of the account identifier to clear and settle trades, each of the local computer system and the remote computer system including a processor, memory, and communications interface, wherein the local computer system and the remote component of FMI are in different time zones;
storing a local node identifier for each local node of a plurality of local nodes, wherein the local computer system is configured to communicate with each local node on the basis of the local node identifier;
communicating local transaction data with the plurality of local nodes with reference to the local node identifiers;
queuing local transaction data received from a local node for a duration before a predetermined time window of operation of the remote component of FMI, and computing the duration based on the predetermined time window of operation translated into a local time;
communicating remote transaction data that corresponds to the queued local transaction data with the remote component of FMI via the remote computer system with reference to local node identifiers and the account identifier of the single account on or after the start of the predetermined time window of operation; and
synchronizing the local transaction data with the remote transaction data.

10. The process of claim 9, wherein:
the remote transaction data includes unconfirmed trade messages received from the remote computer system; and,
the local transaction data includes confirmation messages received from the plurality of local nodes, the confirmation messages corresponding to the unconfirmed trade messages.

11. The process of claim 9, wherein:
the local transaction data received from the plurality of local nodes includes asserted trade messages of trades made by the plurality of local nodes; and,
the remote transaction data includes settlement confirmation messages received from the remote component of FMI.

12. The process of claim 9, further comprising receiving settlement confirmation messages from an interbank payment system that is in communication with the remote component of FMI.

13. The process of claim 12, further comprising communicating the settlement confirmation messages to the plurality of local nodes.

14. The process of claim 9, wherein the remote component of FMI is a remote securities clearinghouse or securities depository.

15. The process of claim 9, wherein the local computer system is configured as a local clearinghouse or securities depository.

16. The process of claim 15, further comprising communicating with each local node through an intermediary computer system that is configured to communicate with local node computer systems on the basis of the local node identifier.

* * * * *